US012627395B2

(12) United States Patent
Barbu et al.

(10) Patent No.: US 12,627,395 B2
(45) Date of Patent: May 12, 2026

(54) NR SCHEME FOR MANAGING EAVESDROPPERS OF PASSIVE RADIOS

(71) Applicant: Nokia Technologies Oy, Espoo (FI)

(72) Inventors: Oana-Elena Barbu, Aalborg (DK); Benny Vejlgaard, Aalborg (DK); Paolo Baracca, Munich (DE)

(73) Assignee: Nokia Technologies Oy, Espoo (FI)

( * ) Notice: Subject to any disclaimer, the term of this patent is extended or adjusted under 35 U.S.C. 154(b) by 222 days.

(21) Appl. No.: 18/500,539

(22) Filed: Nov. 2, 2023

(65) Prior Publication Data

US 2024/0204905 A1 Jun. 20, 2024

Related U.S. Application Data

(60) Provisional application No. 63/433,927, filed on Dec. 20, 2022.

(51) Int. Cl.
*H04K 3/00* (2006.01)

(52) U.S. Cl.
CPC ............... *H04K 3/825* (2013.01); *H04K 3/42* (2013.01)

(58) Field of Classification Search
CPC ................................. H04K 3/825; H04K 3/42
USPC ................................................ 381/73.1, 71.1
See application file for complete search history.

(56) References Cited

U.S. PATENT DOCUMENTS 9,800,367 B1 * 10/2017 Dai ........................ H04K 3/825
10,681,058 B2 * 6/2020 Gehrmann ............ H04W 12/12
10,728,753 B2 * 7/2020 Ekambaram ........ G06F 21/6245
11,323,884 B2 * 5/2022 Lifshitz ................... H04W 4/70
2006/0226969 A1 10/2006 Bandy
2018/0083728 A1 3/2018 Yu
2019/0132347 A1 * 5/2019 Wakid ................. H04L 63/1475
2019/0229833 A1 7/2019 Ha et al.
2021/0175995 A1 6/2021 Ju
2021/0176039 A1 * 6/2021 Fang ...................... H04L 9/3073
2022/0078055 A1 3/2022 Shirakawa et al.
2022/0248386 A1 8/2022 Wolf et al.
2022/0261565 A1 8/2022 Desouky et al.
2023/0284048 A1 * 9/2023 O'Shea ................. H04W 24/04
370/329

(Continued)

FOREIGN PATENT DOCUMENTS

WO 2022/028887 A1 2/2022

OTHER PUBLICATIONS

"3rd Generation Partnership Project; Technical Specification Group Radio Access Network; NR; Physical channels and modulation (Release 17)", 3GPP TS 38.211, V17.2.0, Jun. 2022, pp. 1-136.

(Continued)

*Primary Examiner* — William J Deane, Jr.

(74) *Attorney, Agent, or Firm* — Harness, Dickey & Pierce, P.L.C.

(57) ABSTRACT

In a system, apparatus, method, and non-transitory computer readable medium related to a New Radio (NR) scheme for managing eavesdroppers of Internet of Things (IoT) devices, a network node may be caused to determine a jamming signal configuration associated with at least one IoT device, the jamming signal configuration including jamming signal parameters, and transmit a jamming signal based on the jamming signal parameters, the jamming signal being transmitted at a time corresponding to a transmission by the at least one IoT device.

20 Claims, 6 Drawing Sheets

(56) References Cited

U.S. PATENT DOCUMENTS

2025/0150812 A1 * 5/2025 Elshafie .............. H04W 12/033

OTHER PUBLICATIONS

"3rd Generation Partnership Project; Technical Specification Group Radio Access Network; NR; Physical layer procedures for control (Release 17)", 3GPP TS 38.213, V17.2.0, Jun. 2022, pp. 1-256.
Zhou et al., "Physical layer security with artificial noise: Secrecy capacity and optimal power allocation", 3rd International Conference on Signal Processing and Communication Systems, Sep. 28-30, 2009, 5 pages,.
"Msc-generator", Sourceforge, Retrieved on Oct. 19, 2023, Webpage available at : https://sourceforge.net/projects/msc-generator/.
"Moderator's summary of Discussion [RAN94e-R18Prep-28] Passive IoT", 3GPP TSG RAN#94e, RP-212688, Agenda: 8A.5, Ericsson, Dec. 6-17, 2021, pp. 1-45.
"3rd Generation Partnership Project; Technical Specification Group Radio Access Network; NR; Physical layer procedures for data (Release 17)", 3GPP TS 38.214, V17.2.0, Jun. 2022, pp. 1-228.
Zhou et al., "Safeguarding RFID Wireless Communication Against Proactive Eavesdropping", IEEE Internet of Things Journal, vol. 7, No. 12, Dec. 2020, pp. 11587-11600.
U.S. Appl. No. 63/433,936, "Authentication Relay Procedure for Passive lot", filed on Dec. 20, 2022, pp. 1-36.
"Discussion and decision", 3GPP TSG-RAN #101, RP-231619, Agenda: 9.2.2, Nokia, Sep. 11-15, 2023, 9 pages.
Extended European Search Report received for corresponding European Patent Application No. 23207631.5, dated Apr. 19, 2024, 8 pages.

* cited by examiner

NR SCHEME FOR MANAGING EAVESDROPPERS OF PASSIVE RADIOS

BACKGROUND

Field

Various example embodiments relate to methods, apparatuses, systems, and/or non-transitory computer readable media for providing a scheme for managing eavesdroppers of Internet of Things (IoT) devices, passive radio devices, semi-passive radio devices, active radio devices with limited energy storage capabilities, etc.

Description of the Related Art

The 3rd Generation Partnership Project (3GPP) $5^{th}$ generation mobile network (5G) standard, referred to as 5G New Radio (NR), is being developed to provide higher capacity, higher reliability, and lower latency communications than the 4G long term evolution (LTE) standard.

There have been proposals to extend the 5G NR standard to provide communication support for passive and semi-passive Internet of Things (IoT) devices which may have reduced processing, memory, and/or energy capabilities in comparison to active IoT devices and/or standard user equipment (UE) devices, such as mobile phones, smartphones, etc. Passive IoT devices (and/or passive UE devices, passive tag devices, passive radio devices, semi-passive IoT devices, semi-passive UE devices, semi-passive tag devices, semi-passive radio devices, etc.) are devices which are incapable of initiating communication with the 3GPP network (e.g., device-initiated attachment to the network, etc.) by transmitting data to a base station of the network, etc., and instead, the network must initiate communication (e.g., perform a network-initiated attachment procedure with the device, etc.) with the IoT device. Passive IoT devices may include wireless tags, wireless sensors, industrial wireless sensors, video surveillance devices, and/or wearable smart devices, etc. Passive IoT devices may operate in extreme environmental conditions, e.g., high pressure environments, extreme temperatures, high humidity environments, be subject to constant motion and/or vibrations, etc. Additionally, passive IoT devices may have ultra-low complexity (e.g., to facilitate low cost), small physical sizes and/or small form factors, may desire and/or require maintenance-free operation (e.g., without human intervention), and/or may desire and/or require longer device life cycles, etc. Moreover, the passive IoT device may have limited on-device energy storage capacity and/or may be a battery-less IoT device, etc.

Accordingly, some passive IoT devices may include, may be used with, and/or may be connected to energy harvesting (EH) devices, such as solar panels, wind turbines, heat capture devices, radio frequency (RF) energy harvesting devices, kinetic energy harvesting devices, back-scattering circuitry, etc., which may collect energy for storage in a low-capacity power storage device included in the passive IoT device and/or may power the operation of a battery-less passive IoT device.

SUMMARY

At least one example embodiment relates to a network node.

In at least one example embodiment, the network node may include a memory storing computer readable instructions, and processing circuitry configured to execute the computer readable instructions to cause the network node to, determine a jamming signal configuration associated with at least one Internet of Things (IoT) device, the jamming signal configuration including jamming signal parameters, and transmit a jamming signal based on the jamming signal parameters, the jamming signal being transmitted at a time corresponding to a transmission by the at least one IoT device.

Some example embodiments provide that the jamming signal parameters include at least one of: a time offset indicating a time to transmit the jamming signal, a waveform type, a carrier frequency, a bandwidth, a frequency pattern, a time pattern, a modulation and coding scheme, a transmission power, a jamming signal scheduling, or any combinations thereof.

Some example embodiments provide that the network node is caused to determine the jamming signal configuration by receiving the jamming signal configuration from a network element or an initiator network node.

Some example embodiments provide that the network node is an initiator network node, and the network node is caused to, receive an eavesdropping report from a network element, the eavesdropping report including an eavesdropping probability indicating a probability of an eavesdrop occurrence, and eavesdropped resources indicating the frequency resources being eavesdropped, and determine the jamming signal configuration based on the eavesdropping report.

Some example embodiments provide that the network node is configured as an activator node, and the network node is further caused to transmit an activation signal to the at least one IoT device, the activation signal causing the at least one IoT device to perform the transmission.

Some example embodiments provide that the network node is configured as a reader node, and the network node is further caused to, receive a superimposed signal, the superimposed signal including the transmission by the at least one IoT device and the transmitted jamming signal, remove the transmitted jamming signal from the superimposed signal, and forward contents of the superimposed signal to a network element.

Some example embodiments provide that the superimposed signal includes at least one second jamming signal transmitted by at least one second reader node, and the network node is further caused to, remove the transmitted jamming signal and the at least one second jamming signal from the superimposed signal, and forward contents of the superimposed signal to a network element.

Some example embodiments provide that the at least one IoT device is an energy-harvesting IoT device with or without energy storage capability.

At least one example embodiment relates to a radio access network (RAN) node.

In at least one example embodiment, the RAN node may include a memory storing computer readable instructions, and processing circuitry configured to execute the computer readable instructions to cause the RAN node to, determine a jamming signal configuration associated with at least one Internet of Things (IoT) device, the jamming signal configuration including jamming signal parameters, and transmit the determined jamming signal configuration to at least one jamming node, the jamming signal configuration enabling the at least jamming node to transmit a jamming signal based on the jamming signal parameters, the jamming signal being transmitted at a time corresponding to a transmission by the at least one IoT device.

Some example embodiments provide that the jamming signal parameters include at least one of: a time offset indicating a time to transmit the jamming signal, a waveform type, a carrier frequency, a bandwidth, a frequency pattern, a time pattern, a modulation and coding scheme, a transmission power, a jamming signal scheduling, or any combinations thereof.

Some example embodiments provide that the RAN node is further caused to, determine an eavesdropping probability and an eavesdropped resource based on a network report from at least one reader node, the eavesdropping probability indicating a probability of an eavesdrop occurrence, and the eavesdropped resource indicating the frequency resources being eavesdropped, and transmit an eavesdropping report to the at least one jamming node, the eavesdropping report including the determined eavesdropping probability and the determined eavesdropped resource.

Some example embodiments provide that the RAN node is further caused to, receive contents of a transmission by the at least one IoT device from the at least one jamming node, the contents of the transmission being determined by the at least one jamming node by removing the transmitted jamming signal from a superimposed signal including the transmitted jamming signal and the transmission by the at least one IoT device.

Some example embodiments provide that the RAN node is further caused to, select the at least one jamming node from at least one of an activator node and a plurality of reader nodes, and perform the transmitting the jamming signal configuration by transmitting the jamming signal configuration to the activator node and the plurality of reader nodes.

Some example embodiments provide that the activator node is the selected jamming node, the transmission of the jamming signal configuration enables the activator node to transmit an activation signal to the at least one IoT device and transmit the jamming signal to the at least one IoT device and the plurality of reader nodes, and the transmission of the jamming signal configuration enables the plurality of reader nodes to receive a superimposed signal, the superimposed signal including the transmission by the at least one IoT device and the transmitted jamming signal, remove the transmitted jamming signal from the superimposed signal, and forward contents of the superimposed signal to the RAN node.

Some example embodiments provide that at least one reader node of the plurality of reader nodes is the selected jamming node, the transmission of the jamming signal configuration enables the activator node to transmit an activation signal to the at least one IoT device, and the transmission of the jamming signal configuration enables the selected jamming node to transmit the jamming signal to the at least one IoT device and the plurality of reader nodes, receive a superimposed signal, the superimposed signal including the transmission by the at least one IoT device and the transmitted jamming signal, remove the transmitted jamming signal from the superimposed signal, and forward contents of the superimposed signal to the RAN node.

At least one example embodiment relates to a method of operating a network node.

In at least one example embodiment, the method may include determining a jamming signal configuration associated with at least one Internet of Things (IoT) device, the jamming signal configuration including jamming signal parameters, and transmitting a jamming signal based on the jamming signal parameters, the jamming signal being transmitted at a time corresponding to a transmission by the at least one IoT device.

Some example embodiments provide that the jamming signal parameters include at least one of: a time offset indicating a time to transmit the jamming signal, a waveform type, a carrier frequency, a bandwidth, a frequency pattern, a time pattern, a modulation and coding scheme, a transmission power, a jamming signal scheduling, or any combinations thereof.

Some example embodiments provide that the determining the jamming signal configuration includes receiving the jamming signal configuration from a network element or an initiator network node.

Some example embodiments provide that the network node is an initiator network node, and the method further includes receiving an eavesdropping report from a network element, the eavesdropping report including an eavesdropping probability and an eavesdropped resource, the eavesdropping probability indicating a probability of an eavesdrop occurrence, and the eavesdropped resource indicating the frequency resources being eavesdropped, and determining the jamming signal configuration based on the eavesdropping report.

Some example embodiments provide that the network node is configured as a reader node, and the method further includes, receiving a superimposed signal, the superimposed signal including the transmission by the at least one IoT device and the transmitted jamming signal, removing the transmitted jamming signal from the superimposed signal, and forwarding contents of the superimposed signal to a network element.

At least one example embodiment relates to a network node.

In at least one example embodiment, the network node may include means for determining a jamming signal configuration associated with at least one Internet of Things (IoT) device, the jamming signal configuration including jamming signal parameters, and transmitting a jamming signal based on the jamming signal parameters, the jamming signal being transmitted at a time corresponding to a transmission by the at least one IoT device.

Some example embodiments provide that the jamming signal parameters include at least one of: a time offset indicating a time to transmit the jamming signal, a waveform type, a carrier frequency, a bandwidth, a frequency pattern, a time pattern, a modulation and coding scheme, a transmission power, a jamming signal scheduling, or any combinations thereof.

Some example embodiments provide that the network node further includes means for determining the jamming signal configuration by receiving the jamming signal configuration from a network element or an initiator network node.

Some example embodiments provide that the network node is an initiator network node, and the network node further includes means for receiving an eavesdropping report from a network element, the eavesdropping report including an eavesdropping probability indicating a probability of an eavesdrop occurrence, and eavesdropped resources indicating the frequency resources being eavesdropped, and determining the jamming signal configuration based on the eavesdropping report.

Some example embodiments provide that the network node is configured as an activator node, and the network node further includes means for transmitting an activation signal to the at least one IoT device, the activation signal causing the at least one IoT device to perform the transmission.

Some example embodiments provide that the network node is configured as a reader node, and the network node further includes means for, receiving a superimposed signal, the superimposed signal including the transmission by the at least one IoT device and the transmitted jamming signal, removing the transmitted jamming signal from the superimposed signal, and forwarding contents of the superimposed signal to a network element.

Some example embodiments provide that the superimposed signal includes at least one second jamming signal transmitted by at least one second reader node, and the network node further includes means for, removing the transmitted jamming signal and the at least one second jamming signal from the superimposed signal, and forwarding contents of the superimposed signal to a network element.

Some example embodiments provide that the at least one IoT device is an energy-harvesting IoT device with or without energy storage capability.

At least one example embodiment relates to a radio access network (RAN) node.

In at least one example embodiment, the RAN node may include means for determining a jamming signal configuration associated with at least one Internet of Things (IoT) device, the jamming signal configuration including jamming signal parameters, and transmitting the determined jamming signal configuration to at least one jamming node, the jamming signal configuration enabling the at least jamming node to transmit a jamming signal based on the jamming signal parameters, the jamming signal being transmitted at a time corresponding to a transmission by the at least one IoT device.

Some example embodiments provide that the jamming signal parameters include at least one of: a time offset indicating a time to transmit the jamming signal, a waveform type, a carrier frequency, a bandwidth, a frequency pattern, a time pattern, a modulation and coding scheme, a transmission power, a jamming signal scheduling, or any combinations thereof.

Some example embodiments provide that the RAN node further includes means for, determining an eavesdropping probability and an eavesdropped resource based on a network report from at least one reader node, the eavesdropping probability indicating a probability of an eavesdrop occurrence, and the eavesdropped resource indicating the frequency resources being eavesdropped, and transmitting an eavesdropping report to the at least one jamming node, the eavesdropping report including the determined eavesdropping probability and the determined eavesdropped resource.

Some example embodiments provide that the RAN node further includes means for, receiving contents of a transmission by the at least one IoT device from the at least one jamming node, the contents of the transmission being determined by the at least one jamming node by removing the transmitted jamming signal from a superimposed signal including the transmitted jamming signal and the transmission by the at least one IoT device.

Some example embodiments provide that the RAN node further includes means for, selecting the at least one jamming node from at least one of an activator node and a plurality of reader nodes, and performing the transmitting the jamming signal configuration by transmitting the jamming signal configuration to the activator node and the plurality of reader nodes.

Some example embodiments provide that the activator node is the selected jamming node, the transmission of the jamming signal configuration enables the activator node to transmit an activation signal to the at least one IoT device and transmit the jamming signal to the at least one IoT device and the plurality of reader nodes, and the transmission of the jamming signal configuration enables the plurality of reader nodes to receive a superimposed signal, the superimposed signal including the transmission by the at least one IoT device and the transmitted jamming signal, remove the transmitted jamming signal from the superimposed signal, and forward contents of the superimposed signal to the RAN node.

Some example embodiments provide that at least one reader node of the plurality of reader nodes is the selected jamming node, the transmission of the jamming signal configuration enables the activator node to transmit an activation signal to the at least one IoT device, and the transmission of the jamming signal configuration enables the selected jamming node to transmit the jamming signal to the at least one IoT device and the plurality of reader nodes, receive a superimposed signal, the superimposed signal including the transmission by the at least one IoT device and the transmitted jamming signal, remove the transmitted jamming signal from the superimposed signal, and forward contents of the superimposed signal to the RAN node.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
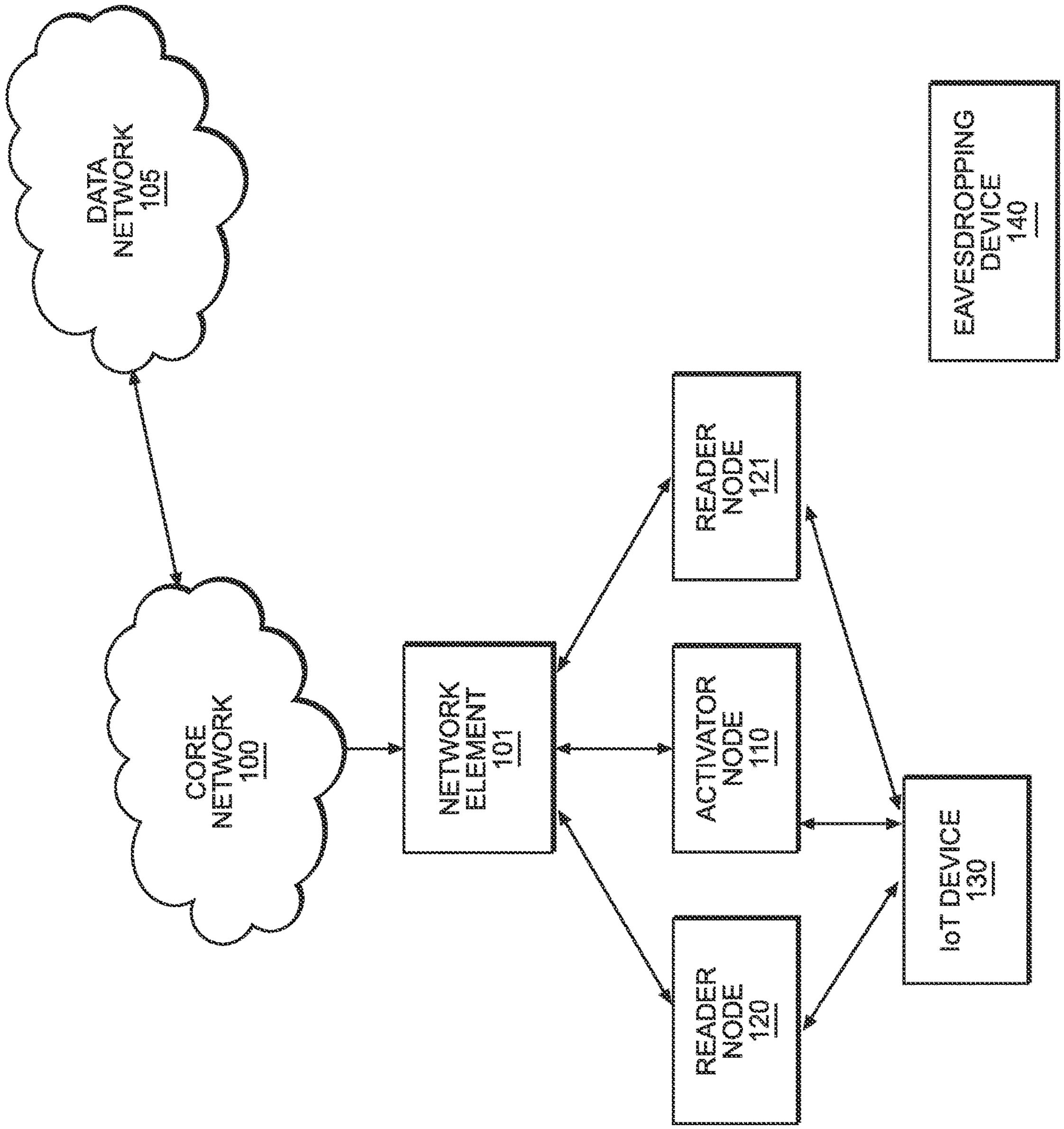
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments configured forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising." "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry): (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions): and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

Various example embodiments are directed towards a scheme for managing eavesdroppers of IoT devices, e.g., energy harvesting (EH) passive radio devices, EH IoT devices, EH passive IoT devices, EH passive UE devices, EH passive tag devices, EH semi-passive IoT devices, EH semi-passive radio devices, EH semi-passive UE devices, EH semi-passive tag devices, EH radio devices with reduced and/or limited energy storage capability, EH IoT devices with reduced and/or limited energy storage capability, etc. Hereinafter, passive devices (e.g., devices without onboard energy storage capabilities) and semi-passive devices (e.g., devices with onboard energy storage capabilities) will be collectively referred to as being passive devices and it will be understood that the various example embodiments discussed herein apply equally to passive devices, semi-passive devices, and/or active devices with limited or reduced energy storage capabilities.

Because IoT devices have limited or no energy storage capabilities and rely on ambient energy sources from which to harvest energy, IoT devices are required to have low or ultra-low power consumption, low or ultra-low complexity, and/or low or ultra-low amount of hardware resources (e.g., processing resources, memory resources, etc.). While the existing 5G NR protocol provides a robust security system through the use of many different security, authentication, and/or encryption algorithms to provide secure authentication and confidential/privacy for active UE devices, these existing security procedures may not (and/or cannot) be provided to IoT devices due to the energy consumption requirements and/or hardware requirements which may strain and/or exceed the capabilities of the IoT devices. Moreover, because the IoT devices may communicate with activator nodes and/or reader nodes over distances from approximately 1 m to approximately 500 m, there is an increased opportunity and/or ability for unauthorized entities to attempt to clone and/or eavesdrop on the communications between the wireless network and the IoT device. For example, attackers may attempt to exploit holes in existing IoT device authentication procedures by conducting "tag cloning" attacks, wherein the attacker attempts to send data to a wireless network by using the identifier (e.g., tag identifier or tag ID) of an existing, authorized tag device. Additionally, attackers may attempt to exploit holes in existing IoT device confidentiality/privacy procedures by attempting to eavesdrop on the emission of data from a IoT device.

Accordingly, new procedures are desired to improve the authentication security and/or communication confidentiality and/or privacy for IoT devices, including for example, reducing and/or preventing an attacker from eavesdropping on emissions and/or transmissions from IoT devices, etc.

FIG. 1 illustrates a wireless communication system according to at least one example embodiment. As shown in FIG. 1, a wireless communication system includes a core network 100, a Data Network 105, a network element 101 of the core network 100, an activator node 110, a first reader node 120, a second reader node 121, etc., but the example embodiments are not limited thereto. According to some example embodiments, the activator node 110 may also be a reader node and/or the activator node 110 may be co-located with a reader node, etc. Additionally, the wireless communication systems may include a plurality of IoT devices (e.g., passive IoT devices and/or semi-passive IoT devices, passive tag devices, tag devices, passive radio devices, semi-passive radio devices, etc.), e.g., IoT device 130, etc., and/or one or more eavesdropping devices operated by an unauthorized and/or unpermitted entity, an attacking entity, etc., such as eavesdropping device 140, etc. However, the example embodiments are not limited thereto, and the example embodiments may include a greater or lesser number of constituent elements, such as two or more activator nodes, a single reader node, three or more reader nodes, two or more IoT devices, one or more active IoT devices, one or more active UE devices, additional base stations, servers, routers, access points, gateways, etc.

The activator node 110, the reader nodes 120, 121, etc., and/or the IoT device 130, etc., may be connected over a wireless network, such as a cellular wireless access network (e.g., a 3G wireless access network, a 4G-Long Term Evolution (LTE) network, a 5G-New Radio (e.g., 5G) wireless network, a 6G wireless network, a WiFi network, etc.). The wireless network may include a core network 100 and/or a Data Network 105. The at least one network element 101, activator node 110 and/or the reader nodes 120, 121 may be implemented as radio access network (RAN) node(s) and/or connect to RAN node(s)(not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

According to at least one example embodiment, the activator node 110 may transmit (and/or broadcast) an activation signal to wake up the IoT device 130, etc. The IoT device 130 may be configured to listen for, monitor for, or otherwise receive the activation signal, modulate the activation signal, and emit (and/or transmit, reflect, backscatter, etc.) a responsive signal, etc. The responsive signal emitted by the IoT device 130 may include an assigned tag identifier (e.g., tag ID) associated with the IoT device 130 and data generated and/or collected, etc., by the IoT device 130. The reader nodes 120 and/or 121, etc., may be configured to listen for the responsive signal from the IoT device 130, read the data payload of the responsive signal, and may forward the data payload to the core network 100, etc. Additionally, according to some example embodiments, when two or more reader nodes, such as the reader nodes 120 and 121, are assigned to the IoT device 130, the two or more reader nodes may localize and/or triangulate the position (e.g., location, current location, current position, etc.) of the IoT device 130, etc.

The activator node 110 and/or the reader nodes 120, 121, etc., may be any one of, but not limited to, a RAN node, an active UE device, a transmission and reception point (TRP), a stationary wireless reader device, a mobile wireless reader device, a tag reader node, an access point, a router, a microcell, a picocell, and/or any other active wireless network node capable of attaching to the core network 100. For example, in some example embodiments, the activator node and/or reader node may be a mobile phone, a smartphone, a tablet, a desktop computer, a laptop computer, a server, a wearable device, an active Internet of Things (IoT) device, a base station, and/or any other type of stationary or portable device capable of operating according to, for example, the 5G NR communication standard, and/or other wireless communication standard(s). The activator node 110 and/or the reader nodes 120, 121, etc., may be configurable to transmit and/or receive data in accordance with strict latency, reliability, and/or accuracy requirements, such as DRX communications, URLLC communications, TSC communications, etc., but the example embodiments are not limited thereto. Additionally, the activator node 110 and the reader nodes 120, 121, etc., may establish a secure link (SL) to communicate with each other.

According to at least one example embodiment, the IoT device 130, etc., may be an energy harvesting passive IoT device, an energy harvesting passive UE device (and/or EH reduced capability (REDCAP) UE device, etc.), etc., and may be configured to harvest energy using EH circuitry (e.g., EH devices, EH apparatuses, and/or EH means, etc.), such as solar cells/panels, wind turbines, water turbines, heat pumps, geothermal heat pumps, kinetic energy harvesting devices and/or vibration harvesting devices, ambient radio frequency (RF) harvesting devices (e.g., back-scattering circuitry configured to energy harvest RF signals transmitted by non-3GPP RF sources and/or non-desired RAT RF sources, such as RF signals transmitted by television broadcast towers, radio broadcast towers, WiFi base stations, etc.), but the example embodiments are not limited thereto. More particularly, according to some example embodiments, the IoT device may harvest energy from a signal (e.g., activation signal) transmitted by the activator node 110 and transmit a reflective and/or responsive signal to one or more of the reader nodes 120, 121, etc.

According to some example embodiments, the IoT device 130 may be a wireless tag, a sensor (e.g., thermometers, humidity sensors, pressure sensors, motion sensors, accelerometers, flood sensors, seismic sensors, etc.), monitoring/tracking sensors (e.g., machine status, parking meter data, vending machine inventory, etc.), utility meters, static and/or mobile asset tracking devices (e.g., for use in industrial and/or warehouse environments, etc.) medical devices, actuators, robotic devices, robotics, drones, connected medical devices, eHealth devices, smart city related devices, smart grid devices, security cameras, autonomous devices (e.g., autonomous unmanned aerial vehicles, etc.), etc., but the example embodiments are not limited thereto.

According to at least one example embodiment, the IoT device 130, etc., may harvest (e.g., obtain, collect, etc.) energy from the at least one EH harvesting circuitry included in, connected to, and/or attached to the IoT device, and the IoT device 130, etc., may store the harvested energy in at least one energy storage device (e.g., a battery, a capacitor, etc.) included in, connected to, and/or associated with the IoT device 130, etc., but the example embodiments are not limited thereto. Additionally, according to some example embodiments, the IoT device 130, etc., may omit the energy storage device, and may be powered directly by the energy collected by the EH harvesting device, etc.

The core network 100 may include at least one network element 101, which may be implemented as a RAN node (e.g., a base station, a wireless access point, etc.) and/or provide core network functions (e.g., a location management function (LMF), an access and mobility management function (AMF), a session management function (SMF), a policy control function (PCF), a unified data management (UDM), a user plane function (UPF), an authentication server function (AUSF), an application function (AF), a network slice selection function (NSSF), etc.), but is not limited thereto. The network element 101 of the core network 100 may operate according to an underlying cellular and/or wireless radio access technology (RAT), such as 5G NR, LTE, Wi-Fi, etc. For example, the RAN node may be a 5G gNB node, an LTE eNB node, or an LTE ng-eNB node, etc., but the example embodiments are not limited thereto. The network element 101 of the core network 100 may provide wireless network services to one or more IoT devices, activator nodes, reader nodes, and/or other UE devices within one or more cells (e.g., cell service areas, broadcast areas, serving areas, coverage areas, etc.) surrounding the respective physical location of the network element 101, etc. Further, one or more of the activator node 110, reader node 120, and/or reader node 121, may be a RAN node as well. Additionally, the network element 101 may provide one or more cells, etc.

In FIG. 1, it is assumed that the activator node 110 and reader nodes 120, 121, etc., are located within the cell service area of the network element 101 of the core network 100, and may connect to, receive broadcast messages from, receive paging messages from, receive/transmit signaling messages from/to, and/or access the wireless network through, etc., the network element 101 of the core network 100, but the example embodiments are not limited thereto.

Additionally, the network element 101 of the core network 100 may be configured to operate in a multi-user (MU) multiple input multiple out (MIMO) mode and/or a massive MIMO (mMIMO) mode, wherein the network element 101 of the core network 100 transmits a plurality of beams (e.g., radio channels, datastreams, streams, etc.) in different spatial domains and/or frequency domains using a plurality of antennas (e.g., antenna panels, antenna elements, an antenna array, etc.) and beamforming and/or beamsteering techniques.

The network element 101 of the core network 100 may be connected to at least one additional core network element (not shown) residing on the core network 100, such as a core network device, a core network server, access points, switches, routers, nodes, etc., but the example embodiments are not limited thereto. The core network 100 may provide network functions, such as a LMF, an AMF, a SMF, a PCF, a UDM, a UPF, an AUSF, an AF, a NSSF, etc., and/or equivalent functions, but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
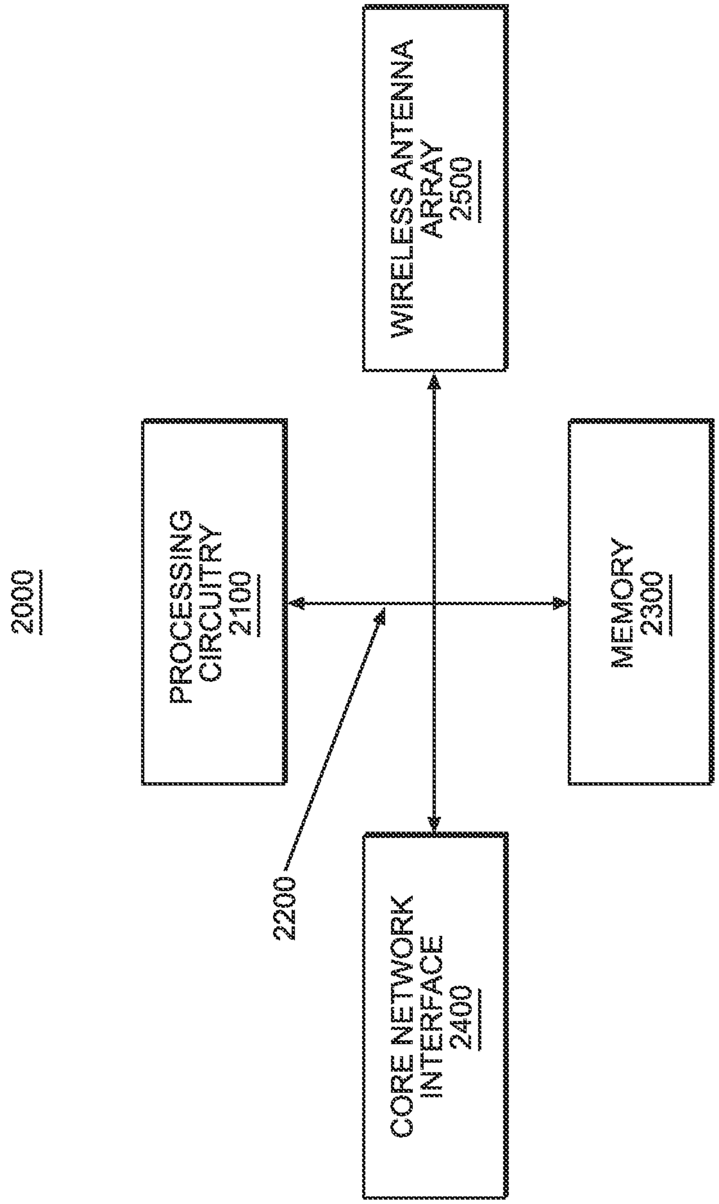
FIG. 2 illustrates a block diagram of an example network element, an example activator node, and/or an example reader node according to at least one example embodiment.

FIG. 2 illustrates a block diagram of an example network element, an example activator node, and/or an example reader node according to at least one example embodiment. The network node of FIG. 2 may correspond to the network element 101, the activator node 110, and/or the reader nodes 120, 121, discussed and/or illustrated in FIG. 1, but the example embodiments are not limited thereto.

Referring to FIG. 2, a network node 2000 may include processing circuitry, such as processing circuitry 2100, at least one communication bus 2200, a memory 2300, at least one core network interface 2400, and/or at least one wireless antenna array 2500, etc., but the example embodiments are not limited thereto. For example, the core network interface 2400 and the wireless antenna array 2500 may be combined into a single network interface, etc., or the node 2000 may include a plurality of wireless antenna arrays, a plurality of core network interfaces, etc., and/or any combinations thereof. The memory 2300 may include various special purpose program code including computer executable instructions which may cause the node 2000 to perform the one or more of the methods of the example embodiments.

In at least one example embodiment, the processing circuitry 2100 may include at least one processor (and/or processor cores, distributed processors, networked processors, etc.), such as at least one processor, which may be configured to control one or more elements of the node 2000, and thereby cause the node 2000 to perform various operations. The processing circuitry 2100 is configured to execute processes by retrieving program code (e.g., computer readable instructions) and data from the memory 2300 to process them, thereby executing special purpose control and functions of the entire node 2000. Once the special purpose program instructions are loaded into the processing circuitry 2100, the processing circuitry 2100 executes the special purpose program instructions, thereby transforming the processing circuitry 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the node 2000, such as the methods discussed in connection with FIGS. 4 to 6, the at least one core network interface 2400, and/or at least one wireless antenna array 2500, etc. Such software elements may be loaded from a non-transitory computer-readable storage medium independent of the memory 2300, using a drive mechanism (not shown) connected to the node 2000, or via the at least one core network interface 2400, and/or at least one wireless antenna array 2500, etc.

In at least one example embodiment, the communication bus 2200 may enable communication and data transmission to be performed between elements of the node 2000. The bus 2200 may be implemented using a high-speed serial bus, a parallel bus, and/or any other appropriate communication technology. According to at least one example embodiment, the node 2000 may include a plurality of communication buses (not shown), such as an address bus, a data bus, etc.

When the network node 2000 operates as a RAN node, for example, a 4G RAN node, a 5G RAN node, etc., the node 2000 may be configured to schedule time domain resource allocations (TDRAs), e.g., orthogonal frequency division multiplexing (OFDM) symbols, physical resource blocks (PRBs), resource elements, etc., for active and/or passive UE devices and/or other nodes (e.g., reader nodes, etc.) connected to the node 2000, but the example embodiments are not limited thereto.

For example, the node 2000 may allocate time-frequency resources of a carrier (e.g., resource blocks with time and frequency dimensions) based on operation on the time domain (e.g., time division duplexing) and/or the frequency domain (e.g., frequency division duplexing). In the time domain context, the node 2000 will allocate a carrier (or subbands of the carrier) to one or more UEs (e.g., active UE devices, etc.) and/or other nodes (e.g., reader nodes 120, 121, activator node 110, etc.) connected to the node 2000 during designated upload (e.g., uplink (UL)) time periods and designated download (e.g., downlink (DL)) time periods, or during designated special (S) time periods which may be used for UL and/or DL, but the example embodiments are not limited thereto.

When there are multiple UEs and/or other network nodes connected to the network node 2000, the carrier is shared in time such that each UE and/or other node is scheduled by the node 2000, and the node 2000 allocates each UE and/or other node with their own uplink time and/or downlink time. In the frequency domain context and/or when performing spatial domain multiplexing of UEs and/or other nodes (e.g., MU MIMO, etc.), the node 2000 will allocate separate frequency subbands of the carrier to UEs and/or other nodes simultaneously served by the node 2000, for uplink and/or downlink transmissions. Data transmission between the UE and/or other nodes with the node 2000 may occur on a radio frame basis in both the time domain and frequency domain contexts. The minimum resource unit for allocation and/or assignment by the node 2000 to a particular UE device and/or particular other node corresponds to a specific downlink/uplink time interval (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will be described as using the time domain, but the example embodiments are not limited thereto.

Additionally, the network node 2000 may transmit scheduling information via physical downlink common channel (PDCCH) information to the one or more UE devices and/or other nodes located within the cell servicing area of the node 2000, which may configure the one or more UE devices and/or other nodes to transmit (e.g., UL transmissions via physical uplink control channel (PUCCH) information and/or physical uplink shared channel information (PUSCH), etc.) and/or receive (e.g., DL transmissions via PDCCH and/or physical downlink shared channel information (PDSCH), etc.) data packets to and/or from the node 2000. For example, the activator node 110 and/or reader nodes 120, 121, etc., may monitor the PDCCH during an ON period of a configured duty cycle (e.g., default duty cycle, network configured duty cycle, etc.), etc., but the example embodiments are not limited thereto. Additionally, the node 2000 may transmit control messages to the UE device and/or other network nodes using downlink control information (DCI) messages via physical (PHY) layer signaling, medium access control (MAC) layer control element (CE) signaling, radio resource control (RRC) signaling, etc., but the example embodiments are not limited thereto. Further, the node 2000 may transmit random access configuration information to allow the activator node 110, reader nodes 120, 121, etc., to request an uplink allocation from the node 2000, etc. According to at least one example embodiment, the random access configuration information may be physical random access channel (PRACH) configuration, but the example embodiments are not limited thereto.

According to some example embodiments, when the network node 2000 operates as a reader node, e.g., reader nodes 120, 121, etc., the node 2000 may act as a relay node and/or intermediary node (e.g., an integrated access and backhaul (IAB) node) between the IoT device 130, etc., and the core network 100, etc. According to some example embodiments, the network node 2000 may be located in a location proximate to one or more IoT devices and may receive data transmitted by the IoT devices and forward and/or relay the data to the core network 100, etc., but the example embodiments are not limited thereto. In other words, the core network 100 may associate and/or assign the node 2000 with at least one IoT device based on a determined and/or calculated distance between the node 2000 and the at least one IoT device (e.g., the node 2000 may be the closest reader node to the IoT device 130 out of the plurality of reader nodes, UE devices, and RAN nodes, etc., of the wireless network), but the example embodiments are not limited thereto. For example, the network node 2000 may be located in a desired geographical area associated with one or more IoT devices and may be assigned by (and/or associated by) the core network 100 to receive the data from the IoT device 130, etc., located within the boundaries and/or associated with the desired geographical area, etc., but the example embodiments are not limited thereto. As another example, the core network 100 may receive location information related to the network node 2000, e.g., from a location sensor, such as GPS receiver, etc., approximate location information, such as angle of arrival (AOA) measurements, observed time difference of arrival (OTDOA), uplink time difference of arrival (UL-TDOA), round trip time (RTT), etc. Moreover, according to some example embodiments, particularly with regards to static RAN nodes and/or static reader nodes, the location of each of the RAN nodes and/or reader nodes may be known to the core network 100 and/or may be stored in a location database indexed based on an identifier associated with each of the RAN nodes, UE devices, and/or reader nodes, etc.

Additionally, according to some example embodiments, when the node 2000 is a reader node and/or an activator node, the node 2000 may be a stationary network node, such as a secondary RAN node, a base station, an access point, etc., connected to the wireless network. Further, according to some example embodiments, the node 2000 may be a mobile network node, such as a UE device capable of operating on the RAT, such as a smartphone, a vehicle, an aerial vehicle, a UAV, etc., but the example embodiments are not limited thereto.

When the network node 2000 is operating as a RAN node, an activator node, and/or a reader node, the node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one IoT device, e.g., IoT device 130, etc., at least one active IoT device (not shown), at least one active UE device (not shown), etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The node 2000 may communicate with a core network (e.g., backend network, backhaul network, backbone network, Data Network, etc.) of the wireless communication network via a core network interface 2400. The core network interface 2400 may be a wired and/or wireless network interface and may enable the node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

While FIG. 2 depicts an example embodiment of a network node 2000, the network element, activator node, and/or reader node are not limited thereto, and may include additional and/or alternative architectures that may be suitable for the purposes demonstrated. For example, the functionality of the network node 2000 may be divided among a plurality of physical, logical, and/or virtual network elements, such as a centralized unit (CU), a distributed unit (DU), a remote radio head (RRH), and/or a remote radio unit (RRU), etc. Additionally, the network node 2000 may operate in standalone (SA) mode and/or non-standalone (NSA) mode using interfaces (not shown) such as X2, Xn, etc., between the network node 2000 and other RAN nodes, activator nodes, and/or reader nodes of the wireless network, interfaces such as S1, NG, etc., between the network node 2000 and the core network (e.g., core network 100), interfaces between network functions of the node 2000 operating in a distributed and/or virtual RAN mode (not shown), such as F1, E1, etc., and/or interfaces between the physical layer (e.g., a baseband unit, etc.) and the radio layer (e.g., a RRH, core network interface 2400, etc.) (not shown), such as CPRI, eCPRI, etc., but the example embodiments are not limited thereto.

Figure 3:
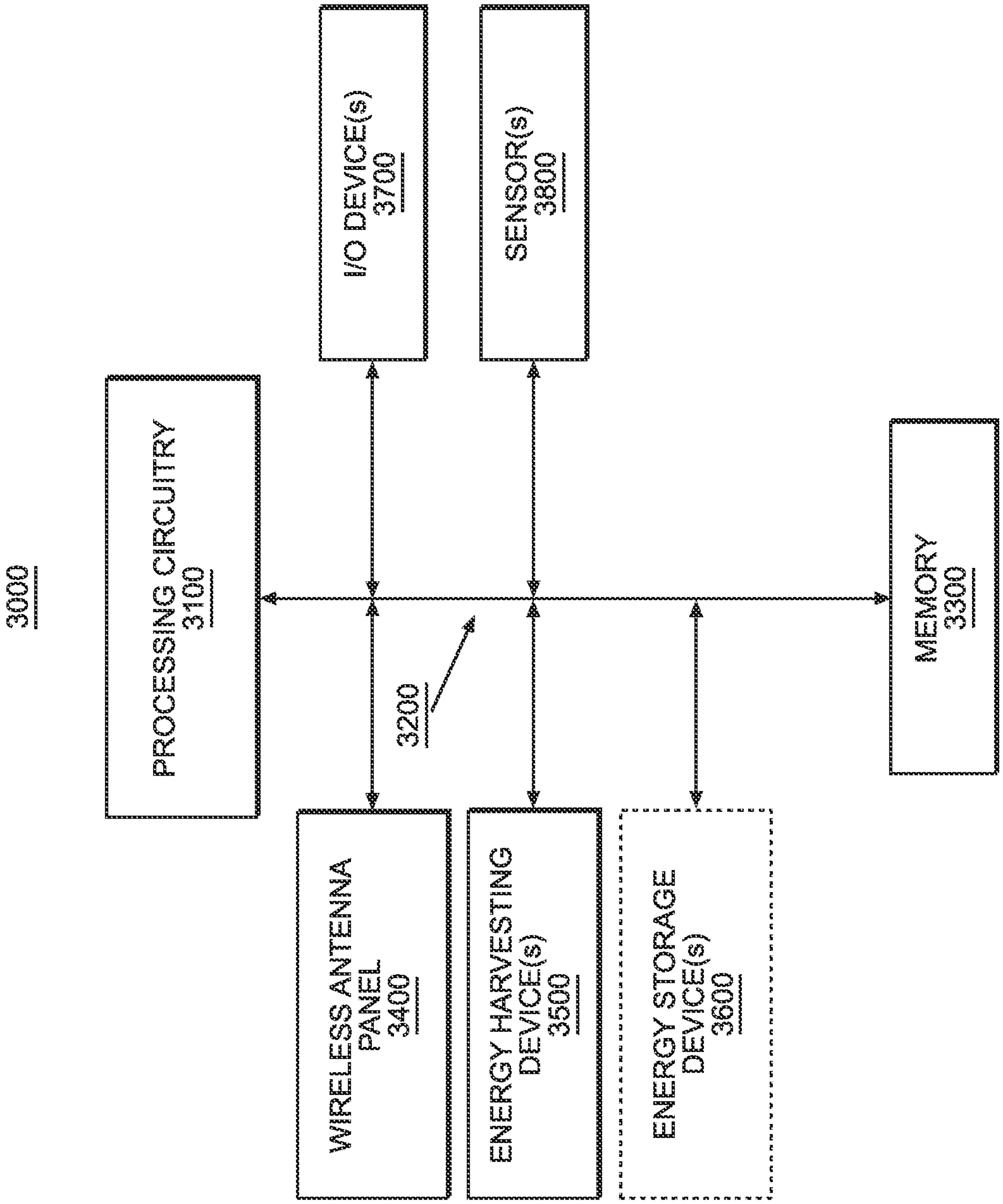
FIG. 3 illustrates a block diagram of an example IoT device according to at least one example embodiment.

FIG. 3 illustrates a block diagram of an example IoT device according to at least one example embodiment. The example IoT device 3000 of FIG. 3 may correspond to the IoT device 130 of FIG. 1, but the example embodiments are not limited thereto, and the IoT device of the example embodiments may employ alternative architectures, etc.

Referring to FIG. 3, an IoT device 3000 (which may also be referred to as a passive tag device, an ambient or passive IoT device, a passive radio device, a semi-passive IoT device, a semi-passive tag device, a semi-passive radio device, etc.) may include processing circuitry 3100, such as at least one processor, at least one communication bus 3200, a memory 3300, a plurality of wireless antennas and/or wireless antenna panels 3400, at least one input/output (I/O) device 3700 (e.g., a microphone, a camera, a speaker, etc.), and/or at least one sensor 3800 (e.g., a motion sensor, a thermal sensor, a seismic sensor, etc.), but the example embodiments are not limited thereto. According to some example embodiments, the IoT device 3000 may include a greater or lesser number of constituent components, and for example, the IoT device 3000 may also include at least one energy harvesting circuitry and/or device 3500, such as radio frequency (RF) harvesting circuitry (e.g., back-scattering circuitry, etc.), one or more solar cells/panels, wind turbines, water turbines, heat pumps, geothermal heat pumps, kinetic energy harvesting devices and/or vibration harvesting devices, etc., and/or at least one energy storage device 3600 (e.g., a battery, a capacitor, etc.), but the example embodiments are not limited thereto. For example, in at least one example embodiment, the energy storage device 3600 may be omitted, and the energy collected by the energy harvesting circuitry 3500 may be used to directly power the IoT device 3000, etc.

According to some example embodiments, the IoT device 3000 may include at least one RF harvesting circuitry capable of collecting energy from ambient RF signals, e.g., RF signals transmitted from sources which do not use the same RAT as the IoT device 3000 and/or RF signals transmitted on a different channel than a RF channel the passive tag is configured to listen to the activation signal on, etc., but the example embodiments are not limited thereto. According to at least one example embodiment, assuming that the IoT device 3000 is configured to operate according to the 5G NR standard, the IoT device 3000 may collect energy from ambient RF signals from television broadcast towers, radio broadcast towers, satellites, WiFi access points, Bluetooth access points, etc., but the example embodiments are not limited thereto. Additionally, the IoT device 3000 may further include one or more proximity sensors 3800, such as one or more proximity sensors (e.g., an infra-red proximity sensor, a capacitive proximity sensor, etc.), one or more location sensors (e.g., GPS, GLONASS, Beidou, Galileo, etc.), other sensors (e.g., thermometers, humidity sensors, pressure sensors, motion sensors, accelerometers, etc.), actuators, a single wireless antenna and/or a single wireless antenna panel, etc. Additionally, the sensor 3800, and/or I/O device 3700, etc., of the IoT device 3000 may be optional.

In at least one example embodiment, the processing circuitry 3100 may include at least one processor (and/or processor cores, distributed processors, networked processors, etc.), such as the at least one processor, which may be configured to control one or more elements of the IoT device 3000, and thereby cause the IoT device 3000 to perform various operations. The processing circuitry 3100 is configured to execute processes by retrieving program code (e.g., computer readable instructions) and data from the memory 3300 to process them, thereby executing special purpose control and functions of the entire IoT device 3000. Once the special purpose program instructions are loaded into the processing circuitry 3100 (e.g., the at least one processor, etc.), the processing circuitry 3100 executes the special purpose program instructions, thereby transforming the processing circuitry 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operation of the IoT device 3000, such as the methods discussed in connection with FIGS. 4 to 6, etc. Such software elements may be loaded from a non-transitory computer-readable storage medium independent of the memory 3300, using a drive mechanism (not shown) connected to the IoT device 3000, or via the wireless antenna 3400, etc. Additionally, the memory 3300 may store network configuration information, such as system information, resource block scheduling, etc., for communicating with at least one RAN node associated with the core network 100, at least one activator node, e.g., activator node 110, and/or at least one reader node, e.g., reader nodes 120, 121, etc., accessing a wireless network, etc., but the example embodiments are not limited thereto. According to some example embodiments, the memory 3300 may also store attachment information (e.g., dedicated physical random access channel (PRACH) configuration information, additional network configuration information, IoT device attachment information, etc.), such as network information associated with and/or corresponding to at least one assigned reader node (e.g., an identifier associated with the reader node, etc.), a configured (e.g., set, desired, and/or required, etc.) timer associated with the assigned reader node, etc., but the example embodiments are not limited thereto.

In at least one example embodiment, the at least one communication bus 3200) may enable communication and data transmission/reception to be performed between elements of the IoT device 3000, and/or monitor the status of the elements of the IoT device 3000 (e.g., monitor the current energy storage level of the energy storage device 3600, monitor the current amount of energy being collected, monitor whether the energy harvesting device 3500 is currently active (e.g., harvesting and/or collecting energy) or currently inactive (e.g., not collecting energy), etc. The bus 3200 may be implemented using a high-speed serial bus, a parallel bus, and/or any other appropriate communication technology. According to at least one example embodiment, the IoT device 3000 may include a plurality of communication buses (not shown), such as an address bus, a data bus, etc.

The IoT device 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. Additionally, the at least one wireless antenna panel 3400 may be configured to transmit and/or receive data communications, etc., but the example embodiments are not limited thereto. The at least one wireless antenna panel 3400 may be located at the same or different physical locations on the body of the IoT device 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc. Additionally, the at least one wireless antenna panel 3400 may be used to collect energy from ambient RF signals, etc.

While FIG. 3 depicts an example embodiment of a IoT device 3000, the IoT device is not limited thereto, and may include additional and/or alternative architectures that may be suitable for the purposes demonstrated.

Figure 4:
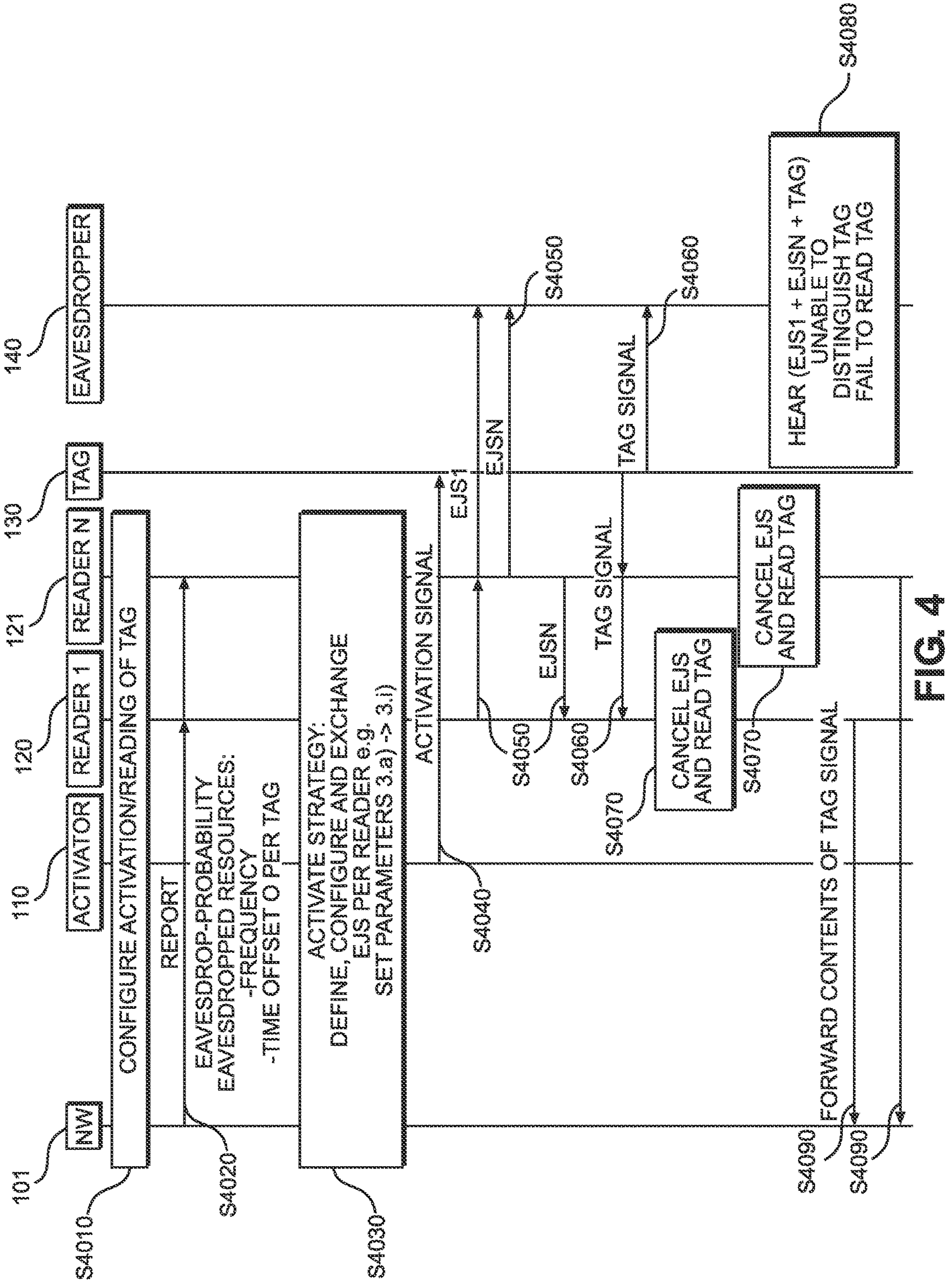
FIG. 4 is an example transmission flow diagram illustrating a first eavesdropper jamming signal method according to at least one example embodiment.

FIG. 4 is an example transmission flow diagram illustrating a first eavesdropper jamming signal method according to at least one example embodiment, but the example embodiments are not limited thereto.

As shown in FIG. 4, according to at least one example embodiment, a wireless network may include at least one network element 101, e.g., a RAN node of the core network 100 of FIG. 1, an LMF function of the core network 100, etc., at least one activator node, e.g., activator node 110 of FIG. 1, at least one IoT device, e.g., IoT device 130 of FIG. 1, a first reader node, e.g., reader node 120 of FIG. 1, a second reader node, e.g., reader node 121 of FIG. 1, etc., but the example embodiments are not limited thereto, and for example, there may be a greater or lesser number of constituent elements in the wireless network of FIG. 4. Additionally, there may be at least one unauthorized eavesdropping device, such as eavesdropping device 140 within communication range of the IoT device 130, the reader nodes 120 and/or 121, and/or the activator node 110, etc., but the example embodiments are not limited thereto.

According to at least one example embodiment, in operation S4010, a IoT device activation/reading configuration process may occur. The configuration process may include a network element 101, e.g., a RAN node of the core network 100, receiving an initiation message from one or more network nodes, e.g., an initiator network node, an initiation network node, etc., indicating that at least one IoT device 130 may have data to transmit to the network. According to at least one example embodiment, the initiator network node may be any one of the network nodes 110, 120, 121, etc., but is not limited thereto, and for example, may be a separate UE device attached to the core network 100, a RAN node of the core network, a location and management function (LMF) network element, and/or other network element, etc. The RAN node may then assign and/or associate one or more UE devices and/or RAN nodes, etc., to act as the activator node (e.g., activator node 110) and/or the reader nodes (e.g., reader nodes 120, 121, etc.) to the one or more IoT devices 130. For example, the RAN node may make the determinations based on current location information associated with one or more of the UE devices and/or RAN nodes in relation to the known, triangulated, and/or expected location of the IoT device 130, the capabilities of the UE devices and/or RAN nodes (e.g., whether the UE device is full duplex or half duplex, etc.), a current status of the UE devices and/or RAN nodes (e.g., active state, sleep state, in motion, stationary, etc.), and/or current network conditions, etc., but the example embodiments are not limited thereto.

For example, a UE device may be selected as an activator node when the UE device is determined and/or estimated to be within less than 10 meters of the IoT device, whereas a RAN node may be selected to be the activator node if it is within 10 to 50 meters away from the IoT device, etc., but the example embodiments are not limited thereto. As another example, the UE devices and/or RAN nodes may be selected based on a current power budget available to the UE device and/or RAN nodes, or in other words, the UE devices and/or RAN nodes with the largest power budget available may be selected because they may be more capable of jamming the eavesdropping device 140 (and/or the potential attacker, etc.).

Additionally, according to some example embodiments, the network element 101 of the core network 100 may assign and/or associate one or more network nodes to the at least one IoT device 130 based on at least one measured signal quality metric between the respective network node and the IoT device 130, e.g., a signal interference to noise ratio (SINR), etc., but the example embodiments are not limited thereto. For example, the network element 101 of the core network 100 may assign the network node 110 to be the activator node and/or the network nodes 120, 121, to be the reader nodes for the at least one IoT device 130 in response to the network nodes 110, 120, and 121 having the highest SINR value out of a plurality of candidate network nodes, etc., but the example embodiments are not limited thereto, and for example, the network element 101 of the core network 100 may assign and/or associate the network node 2000 to be the activator node and/or a reader node for the one or more IoT devices based on a combination of distance and signal quality, etc.

In operation S4020, according to at least one example embodiment, one or more of the network nodes 110, 120, and/or 121 may measure the SINR and/or other signal quality metrics based on and/or using a signal emitted, reflected, and/or transmitted by the IoT device 130, etc., for example, in response to a discovery signal and/or the activation signal transmitted to the IoT device 130 by the network nodes 110, 120, and/or 121, etc., and/or another network node, UE device, etc. For example, the network nodes 110, 120, and/or 121 may transmit a discovery signal on a periodic basis and/or may transmit the discovery signal on a dynamic basis (e.g., at the instruction and/or control of the core network 100, etc.), which may cause the IoT device 130 and/or any eavesdropping devices, e.g., eavesdropping device 140 to emit a responsive and/or reflective signal, etc. The network nodes 110, 120, and/or 121 and/or other network nodes/UE devices may then listen for and/or measure the SINR and/or other signal quality metrics of the received signals, and transmit reports, e.g., measurement reports, including the SINR and/or other signal quality metric, etc., to the core network 100, etc., but the example embodiments are not limited thereto. The core network 100 and/or the network element 101 (e.g., the LMF function, a RAN node associated with the core network 100, etc.)) may then calculate and/or determine a probability of an eavesdropper (and/or probability of an eavesdropper occurrence) based on the measurement reports, for example, by identifying a signal with a lower SINR or greater SINR than an expected SINR (and/or configured, set, desired, etc., SINR threshold range) for signals from authorized and/or known passive IoT devices reflecting the discovery signal and/or activation signal, but the example embodiments are not limited thereto. Additionally, the network element 101 of the core network 100 may also determine the frequency resources and/or the time intervals that are believed to be being eavesdropped upon using the measurement information included in the measurement reports, etc., but the example embodiments are not limited thereto. Further, the network element 101 of the core network 100 may determine a time offset O for each IoT device, etc. The time offset O may indicate the time when the IoT device will and/or is expected to emit, reflect, and/or transmit a data signal in response to an activation signal being transmitted to the IoT device, etc. According to some example embodiments, the time offset O may be determined for each IoT device being activated by an activator node, but the example embodiments are not limited thereto.

However, the example embodiments are not limited thereto, and the network element 101 and/or the core network 100 may determine the probability of an eavesdropper occurrence, the eavesdropped frequency resources, and/or the time intervals that are believed to be being eavesdropped, based on other and/or additional information. For example, the network element 101 may further receive measurement reports from other network nodes in the area which have not been assigned to the IoT device 130, may receive reports of recent tag device reading failures and/or explicit reports of malicious activity involving one or more tag devices and/or one or more reader nodes, etc., and/or may receive reports involving non-radio and/or non-wireless network data, such as data from security cameras in the area, etc., but the example embodiments are not limited thereto.

According to some example embodiments, the network element 101 of the core network 100, may then transmit an eavesdropper report to the configured activator node 110 and/or the configured reader nodes 120, 121, etc., assigned to the IoT device 130, etc.

In operation S4030, according to at least one example embodiment, the configured activator node 110 and/or the configured reader nodes 120, 121, etc., assigned to the IoT device 130 may determine a common eavesdropper blocking strategy, e.g., a jamming signal configuration associated with the IoT device 130, the jamming signal configuration including jamming signal parameters (e.g., set jamming signal parameters, configured jamming signal parameters, preconfigured jamming signal parameters, predefined jamming signal parameters, determined jamming signal parameters, etc.), in response to the determined eavesdropping probability and/or the determined eavesdropped resources included in the eavesdropper report, etc., but the example embodiments are not limited thereto. In at least one example embodiments, if all of the network nodes 110, 120, and 121, etc., assigned to the IoT device 130 are UE devices, then the communication among the network nodes 110, 120, and 121, etc., may be performed over a secure link (SL) on the wireless network, such as an Xn interface, a NRPPa interface, a DL interface, a LPP interface, etc., but the example embodiments are not limited thereto. However, if not all of the network nodes 110, 120, and 121, etc., are UE devices (e.g., at least one of the network nodes is a RAN node, etc.), then the network nodes may use standard uplink (UL)/downlink (DL) to communicate, vote on, and/or configure the jamming signal configuration and/or the jamming signal parameters, etc.

According to some example embodiments, if one of the configured network nodes 110, 120, and 121 is the initiator network node, then the initiator network node may be selected as the primary network node and may determine, define, and/or select the jamming signal configuration and/or the jamming signal parameters. However, the example embodiments are not limited thereto, and for example, the primary network node may be selected on a round-robin basis, random basis, based on the highest available power budget, etc., among the configured network nodes 110, 120, and 121, and/or the network element 101 of the core network 100 may select the primary network node, etc.

Once the primary network node has been determined, the primary network node may determine the configuration of the eavesdropping jamming signal (EJS) for each reader node assigned to each IoT device being activated, e.g., tag 130, etc. For example, the EJS parameters may include at least one of: a time offset indicating the time to transmit the jamming signal with respect to either the transmission of configuration message (e.g., of operation S4010) or the activation signal by the activator node (e.g., of operation S4040) such that the transmission of the EJS overlaps with the emission of the data signal from the IoT device 130 to block and/or hinder the eavesdropping device 140 from being able to listen to the data signal emitted by the IoT device 130, a set, configured, determined, etc., waveform type (e.g., OFDM, SC-FDMA, etc.), a set, configured, determined, etc., carrier frequency, a set, configured, determined, etc., bandwidth, a set, configured, determined, etc., frequency pattern (e.g., the indices of the subcarriers occupied by the EJS, etc.), a set, configured, determined, etc., time pattern (e.g., the indices of symbols occupied by the EJS, etc.), a set, configured, determined, etc., modulation and coding scheme (e.g., QPSK, Zadoff-Chu, etc.), a set, configured, determined, etc., transmission power, a set, configured, determined, etc., jamming signal scheduling (e.g., indicating how many network nodes transmit the EJS, the assignment of the network nodes transmitting the EJS, and/or the frequency/periodicity of the transmission of the EJS, etc.), or any combinations thereof. According to some example embodiments, one or more of the network nodes may only be capable of operating in half-duplex, or in other words, may only either generate the EJS or read the data signal emitted by the IoT device, but not both, whereas other network nodes may be full duplex and may both generate the EJS and read the data signal emitted by the IoT device. For example, as shown in FIG. 4, the network node 110 may be either a half-duplex or a full duplex network node and may be assigned to be the activator node, and the network nodes 120 and 121 may both be full duplex network nodes and may both be assigned to be reader/jamming nodes, but the example embodiments are not limited thereto.

In operation S4040, the assigned activator node 110 may transmit the activation signal associated with the IoT device 130, etc., in accordance with the configuration of the EJS.

In operation S4050, the assigned reader/jamming nodes 120 and 121 generate and transmit (e.g., broadcast) a jamming signal in accordance with the configuration of the EJS. As shown in FIG. 4, according to some example embodiments, the EJS1 transmitted by the reader node 120 may be received by the eavesdropper 140, and the reader node 121, etc., but is not limited thereto. Additionally, the EJSN transmitted by the reader node 121 may be received by the eavesdropper 140, and the reader node 120, etc., but is not limited thereto. Concurrently, in operation S4060, the IoT device 130 may emit, reflect, backscatter, and/or transmit its data signal. The data signal emitted by the IoT device 130 may include at least the tag ID of the IoT device 130 and/or data sensed, collected and/or generated by the IoT device 130, etc., but is not limited thereto. Moreover, the EJS1 and the EJSN signals may be transmitted at a higher transmission power level than the data signal emitted by the IoT device 130, thereby increasing the difficulty of the eavesdropping device 140 hearing the data signal of the IoT device 130, etc.

In operation S4070, the reader nodes 120 and 121 may receive both the EJS transmitted by the other reader node and the data signal of the IoT device 130 at approximately the same time (and/or during an overlapping time period), etc. The reception of both the EJS and the data signal of the IoT device 130 may be referred to as receiving a combined signal, a plurality of signals, a set of superimposed signals, etc. Because the reader nodes 120 and 121 have been configured with the jamming signal parameters, the reader nodes 120 and 121 may remove, separate, cancel, filter, etc., the EJS1 and/or the EJSN from the combined signal, and may then read, obtain, extract, and/or determine the contents of the data signal emitted by the IoT device 130, etc.

However, in operation S4080, while the eavesdropping device 140 may receive the data signal emitted by the IoT device 130, the eavesdropping device 140 may not be able to read the contents of the data signal due to the interference from the EJS1 and/or EJSN signals. In other words, because the eavesdropping device 140 does not have knowledge of the EJS scheme being implemented by the reader nodes 120, 121, the eavesdropping device 140 may be unable to remove the data signal emitted by the IoT device 130 from the combined signal, thereby improving the security, confidentiality, and privacy of the data emitted by the IoT device, etc.

In operation S4090, the reader nodes 120 and 121 may forward and/or transmit the read data received from the IoT device 130 to the network element 101 of the core network 100, but the example embodiments are not limited thereto.

Figure 5:
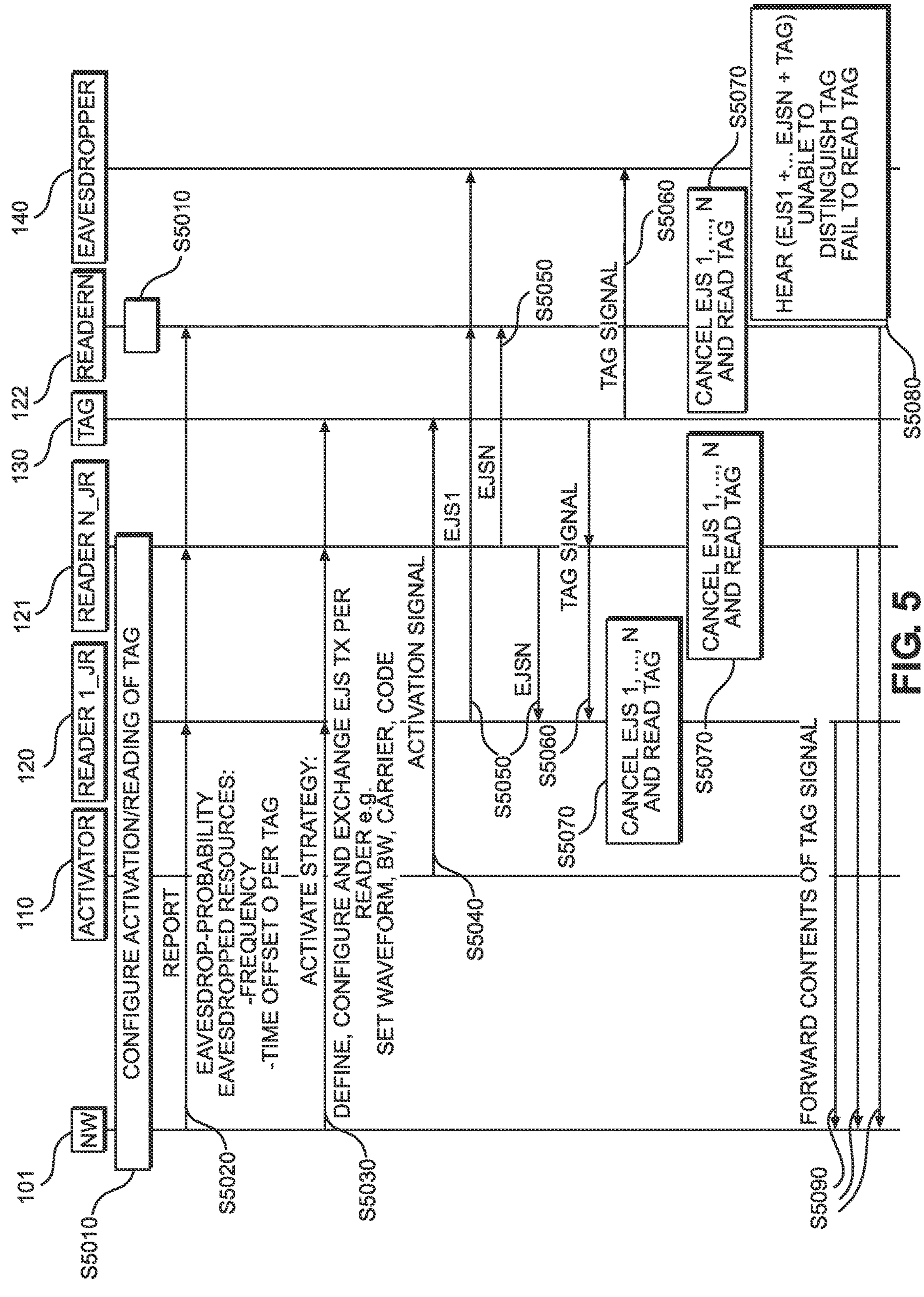
FIG. 5 is an example transmission flow diagram illustrating a second eavesdropper jamming signal method according to at least one example embodiment.

FIG. 5 is an example transmission flow diagram illustrating a second eavesdropper jamming signal method according to at least one example embodiment. In contrast to the wireless network illustrated in FIG. 4, the wireless network of FIG. 5 includes a third network node 122 which may be a half-duplex node, but is not limited thereto.

Referring now to FIG. 5, in operation S5010, similar to operation S4010 of FIG. 4, the IoT device activation/reading configuration process may be performed. As shown in FIG. 5, it is assumed that the network node 110 is configured as the activator node, and the network nodes 120, 121, and 122 are configured as the reader nodes, but the example embodiments are not limited thereto.

In operation S5020, similar to operation S4020, the network element 101 of the core network 100 may calculate and/or determine a probability of an eavesdropper based on measurement reports received from one or more of the network nodes 110, 120, 121, 122, etc. Additionally, the network element 101 of the core network 100 (and/or other network element) may determine the frequency resources and/or the time intervals that are believed to be being eavesdropped upon using the measurement information included in the measurement reports, etc., as well as a time offset O for each IoT device, etc., but the example embodiments are not limited thereto.

According to some example embodiments, the network element 101 of the core network 100, may then transmit an eavesdropper report to the configured activator node 110 and/or the configured reader nodes 120, 121, 122, etc., assigned to the IoT device 130, etc.

In operation S5030, in contrast to operation S4030, the network element 101 of the core network 100, instead of one or more of the network nodes assigned to the IoT device 130, determines an eavesdropper blocking strategy, e.g., the jamming signal configuration associated with the IoT device 130 and the jamming signal parameters, etc., in response to the determined eavesdropping probability and/or the determined eavesdropped resources, but the example embodiments are not limited thereto. The network element 101 may then transmit the jamming signal configuration to the network nodes 110, 120, 121, and/or 122, etc., but is not limited thereto. As shown in FIG. 5, the network element 101 of the core network 100 may assign the reader nodes 120 and 121 to act as jamming reader nodes, and may assign the reader node 122 to act as a normal reader node (e.g., a standard reader node, a localizing reader node, etc.), but the example embodiments are not limited thereto.

In operation S5040, similar to operation S4040, the activator node 110 may transmit an activation signal to the IoT device 130 based on the jamming signal parameters. In operation S5050, the jamming reader nodes 120 and 121 may transmit jamming signals EJS1 and EJSN, respectively, based on the jamming signal parameters. The jamming reader nodes 120 and 121 may transmit the jamming signals EJS1 and EJSN during a time window corresponding to the time window when the IoT device is expected to emit its data signal (e.g., a tag transmission time window; a tag emission time window, a tag backscattering time window; etc.) in response to the activation signal. Concurrently, in operation S5060, the IoT device 130 emits the tag data signal to the jamming reader nodes 120, 121, the half-duplex reader node 122, and the eavesdropper device 140, etc.

In operation S5070, similar to operation S4070, the jamming reader nodes 120 and 121 and the half-duplex reader node 122 may receive the combined EJS1, EJSN, and tag data signal, etc. Because the jamming reader nodes 120 and 121 and the half-duplex reader node 122 have been configured with the jamming signal parameters, the jamming reader nodes 120 and 121 and the half-duplex reader node 122 may remove, separate, cancel, filter, etc., the EJS1 and/or the EJSN signals from the combined signal, and may then read, obtain, extract, and/or determine the contents of the data signal emitted by the IoT device 130, etc.

In contrast, in operation S5080, the eavesdropper device 140 may fail to read the contents of the tag data signal because it is unaware of the jamming signal parameters, and therefore it is unable to distinguish the tag data signal from the interference of the jamming signals, EJS1 and/or EJSN, etc., thereby improving the security of the tag data signal.

In operation S5090, similar to operation S4090, the jamming reader nodes 120 and 121 and the half-duplex reader node 122 may transmit the read data from the tag data signal to the network element 101 of the core network 100, etc., but the example embodiments are not limited thereto.

Figure 6:
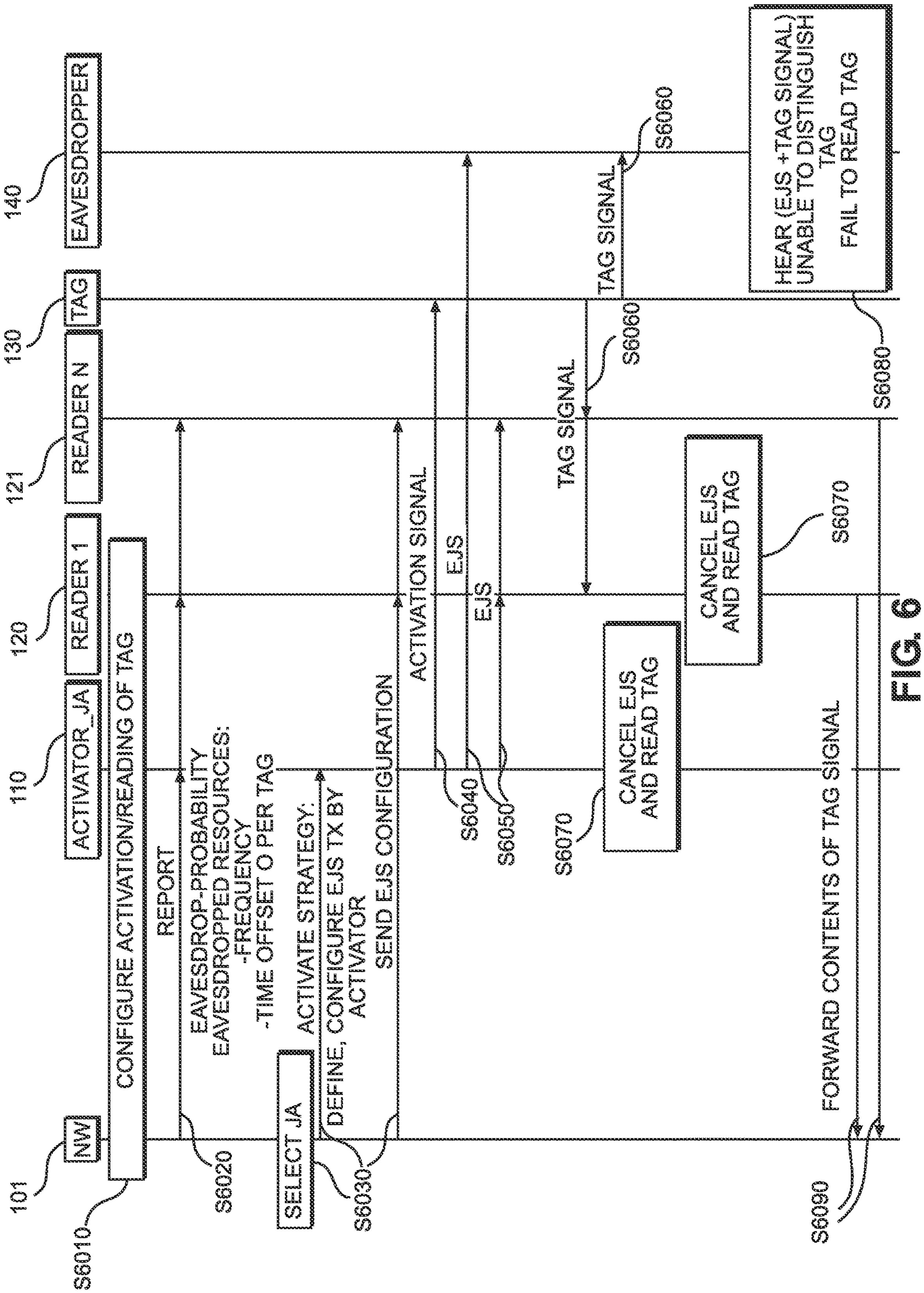
FIG. 6 illustrates an example transmission flow diagram illustrating a third eavesdropper jamming signal method according to at least one example embodiment.

FIG. 6 is an example transmission flow diagram illustrating a third eavesdropper jamming signal method according to at least one example embodiment.

Referring now to FIG. 6, in operation S6010, similar to operations S4010 of FIGS. 4 and S5010 of FIG. 5, the IoT device activation/reading configuration process may be performed by the network element 101 of core network 100. As shown in FIG. 6, it is assumed that the network node 110 is configured as the activator node, and the network nodes 120, 121 are configured as the reader nodes, but the example embodiments are not limited thereto.

In operation S6020, similar to operations S4020 and S5020, the network element 101 of the core network 100 may calculate and/or determine a probability of an eavesdropper based on measurement reports received from one or more of the network nodes 110, 120, 121, etc. Additionally, the network element 101 of the core network 100 (and/or other network element) may determine the frequency resources and/or the time intervals that are believed to be being eavesdropped upon using the measurement information included in the measurement reports, etc., as well as a time offset O for each IoT device, etc., but the example embodiments are not limited thereto.

According to some example embodiments, the network element 101 of the core network 100, may then transmit an eavesdropper report to the configured activator node 110 and/or the configured reader nodes 120, 121, etc., assigned to the IoT device 130, etc.

In operation S6030, similar to operation S5030, the network element 101 of the core network 100 determines eavesdropper blocking strategy, e.g., the jamming signal configuration associated with the IoT device 130 and the jamming signal parameters, etc., in response to the determined eavesdropping probability and/or the determined eavesdropped resources, but the example embodiments are not limited thereto. However, in contrast to FIG. 5, the network element 101 of the core network 100 may assign the reader nodes 120 and 121 to act as normal reader nodes, and may assign the activator node 110 to act as a jamming activator node, but the example embodiments are not limited thereto. The network element 101 may then transmit the jamming signal configuration to the network nodes 110, 120, 121, etc.

In operation S6040, similar to operations S4040 and S5040, the jamming activator node 110 may transmit an activation signal to the IoT device 130 based on the jamming signal parameters. In operation S6050, in contrast to operation S4040 and S5040, the jamming activator node 110 may also transmit the jamming signal EJS based on the jamming signal parameters. The jamming activator node 110 transmits the jamming signal EJS during a time window corresponding to the time window when the IoT device 130 is expected to emit its data signal in response to the previously transmitted activation signal. Concurrently, in operation S6060, the IoT device 130 emits the tag data signal to the reader nodes 120, 121 and the eavesdropper device 140.

In operation S6070, similar to operations S4070 and S5070, the reader nodes 120 and 121 may receive combined EJS and tag data signal, etc. Because the reader nodes 120 and 121 have been configured with the jamming signal parameters, the reader nodes 120 and 121 may remove, cancel, separate, filter, etc., the EJS signal from the combined signal, and may then read the contents of the data signal emitted by the IoT device 130, etc.

In contrast, in operation S6080, the eavesdropper device 140 may fail to read the contents of the tag data signal because it is unaware of the jamming signal parameters, and therefore the eavesdropper device 140 is unable to distinguish the tag data signal from the interference of the jamming signal, EJS, etc., thereby improving the security of the tag data signal.

In operation S6090, similar to operations S4090 and S5090, the reader nodes 120 and 121 may transmit the read data from the tag data signal to the network element 101 of the core network 100, etc., but the example embodiments are not limited thereto.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A network node, comprising:

a memory storing computer readable instructions; and processing circuitry configured to execute the computer readable instructions to cause the network node to, determine a jamming signal configuration associated with at least one Internet of Things (IoT) device, the jamming signal configuration including jamming signal parameters, and transmit a jamming signal based on the jamming signal parameters, the jamming signal being transmitted at a time corresponding to a transmission by the at least one IoT device.

2. The network node of claim 1, wherein the jamming signal parameters include at least one of:

a time offset indicating a time to transmit the jamming signal, a waveform type, a carrier frequency, a bandwidth, a frequency pattern, a time pattern, a modulation and coding scheme, a transmission power, a jamming signal scheduling, or any combinations thereof.

3. The network node of claim 1, wherein the network node is caused to determine the jamming signal configuration by:

receiving the jamming signal configuration from a network element or an initiator network node.

4. The network node of claim 1, wherein the network node is an initiator network node; and the network node is caused to:

receive an eavesdropping report from a network element, the eavesdropping report including an eavesdropping probability indicating a probability of an eavesdrop occurrence, and eavesdropped resources indicating frequency resources being eavesdropped; and determine the jamming signal configuration based on the eavesdropping report.

5. The network node of claim 1, wherein the network node is configured as an activator node, and the network node is further caused to:

transmit an activation signal to the at least one IoT device, the activation signal causing the at least one IoT device to perform the transmission.

6. The network node of claim 1, wherein the network node is configured as a reader node, and the network node is further caused to:

receive a superimposed signal, the superimposed signal including the transmission by the at least one IoT device and the jamming signal;

remove the jamming signal from the superimposed signal; and forward contents of the superimposed signal to a network element.

7. The network node of claim 6, wherein the superimposed signal includes at least one second jamming signal transmitted by at least one second reader node; and the network node is further caused to remove the jamming signal and the at least one second jamming signal from the superimposed signal, and forward contents of the superimposed signal to a network element.

8. The network node of claim 1, wherein the at least one IoT device is an energy-harvesting radio device with or without energy storage capability.

9. A radio access network (RAN) node comprising:

a memory storing computer readable instructions; and processing circuitry configured to execute the computer readable instructions to cause the RAN node to:

determine a jamming signal configuration associated with at least one Internet of Things (IoT) device, the jamming signal configuration including jamming signal parameters, and transmit the jamming signal configuration to at least one jamming node, the jamming signal configuration enabling the at least one jamming node to transmit a jamming signal based on the jamming signal parameters, the jamming signal being transmitted at a time corresponding to a transmission by the at least one IoT device.

10. The RAN node of claim 9, wherein the jamming signal parameters include at least one of:

a time offset indicating a time to transmit the jamming signal, a waveform type, a carrier frequency, a bandwidth, a frequency pattern, a time pattern, a modulation and coding scheme, a transmission power, a jamming signal scheduling, or any combinations thereof.

11. The RAN node of claim 9, wherein the RAN node is further caused to:

determine an eavesdropping probability and an eavesdropped resource based on a network report from at least one reader node, the eavesdropping probability indicating a probability of an eavesdrop occurrence, and the eavesdropped resource indicating frequency resources being eavesdropped; and transmit an eavesdropping report to the at least one jamming node, the eavesdropping report including the eavesdropping probability and the determined eavesdropped resource.

12. The RAN node of claim 9, wherein the RAN node is further caused to:

receive contents of a transmission by the at least one IoT device from the at least one jamming node, the contents of the transmission being determined by the at least one jamming node by removing the jamming signal from a superimposed signal including the jamming signal and the transmission by the at least one IoT device.

13. The RAN node of claim 9, wherein the RAN node is further caused to:

select the at least one jamming node from at least one of an activator node and a plurality of reader nodes; and transmit the jamming signal configuration to the at least one jamming node.

14. The RAN node of claim 13, wherein the at least one jamming node is the activator node;

the transmission of the jamming signal configuration enables the activator node to, transmit an activation signal to the at least one IoT device, and transmit the jamming signal to the at least one IoT device and the plurality of reader nodes; and the transmission of the jamming signal configuration enables the plurality of reader nodes to, receive a superimposed signal, the superimposed signal including the transmission by the at least one IoT device and the jamming signal, remove the jamming signal from the superimposed signal, and forward contents of the superimposed signal to the RAN node.

15. The RAN node of claim 13, wherein the at least one jamming node is selected from at least one reader node;

the transmission of the jamming signal configuration enables the activator node to transmit an activation signal to the at least one IoT device; and the transmission of the jamming signal configuration enables the jamming node to, transmit the jamming signal to the at least one IoT device and the at least one reader nodes, receive a superimposed signal, the superimposed signal including the transmission by the at least one IoT device and the jamming signal, remove the jamming signal from the superimposed signal, and forward contents of the superimposed signal to the RAN node.

16. A method of operating a network node, the method comprising:

determining a jamming signal configuration associated with at least one Internet of Things (IoT) device, the jamming signal configuration including jamming signal parameters; and transmitting a jamming signal based on the jamming signal parameters, the jamming signal being transmitted at a time corresponding to a transmission by the at least one IoT device.

17. The method of claim 16, wherein the jamming signal parameters include at least one of:

a time offset indicating a time to transmit the jamming signal, a waveform type, a carrier frequency, a bandwidth, a frequency pattern, a time pattern, a modulation and coding scheme, a transmission power, a jamming signal scheduling, or any combinations thereof.

18. The method of claim 16, wherein the determining the jamming signal configuration includes:

receiving the jamming signal configuration from a network element or an initiator network node.

19. The method of claim 16, wherein the network node is an initiator network node; and the method further includes receiving an eavesdropping report from a network element, the eavesdropping report including an eavesdropping probability and an eavesdropped resource, the eavesdropping probability indicating a probability of an eavesdrop occurrence, and the eavesdropped resource indicating t frequency resources being eavesdropped; and determining the jamming signal configuration based on the eavesdropping report.

20. The method of claim 16, wherein the network node is configured as a reader node, and the method further includes receiving a superimposed signal, the superimposed signal including the transmission by the at least one IoT device and the jamming signal;

removing the jamming signal from the superimposed signal; and forwarding contents of the superimposed signal to a network element.

* * * * *